United States Patent [19]

McEarthron

[11] Patent Number: 4,704,150
[45] Date of Patent: Nov. 3, 1987

[54] GLASS FIBER FORMING BUSHING ASSEMBLY

[75] Inventor: Eugene D. McEarthron, Butler, Pa.
[73] Assignee: PPG Industries, Inc., Pittsburgh, Pa.
[21] Appl. No.: 938,315
[22] Filed: Dec. 5, 1986
[51] Int. Cl.⁴ .............................................. C03B 37/02
[52] U.S. Cl. .............................................. 65/1; 65/27; 65/172
[58] Field of Search ...................... 65/1, 2, 12, 172, 27

[56] References Cited

U.S. PATENT DOCUMENTS

| | | | |
|---|---|---|---|
| 1,608,967 | 11/1926 | Tucker et al. | 65/172 |
| 4,119,411 | 10/1978 | Anderson et al. | 65/172 X |
| 4,167,403 | 9/1979 | Coggin | 65/1 |
| 4,332,602 | 6/1982 | Jensen | 65/12 |
| 4,351,656 | 9/1982 | Jensen | 65/1 |
| 4,363,645 | 12/1982 | Eisenbergh | 65/2 |

Primary Examiner—Robert L. Lindsay
Attorney, Agent, or Firm—John E. Curley

[57] ABSTRACT

A bushing assembly is described which involves two fiber glass bushings, one being a production bushing and the other a permanent bushing attached to a fiber glass forehearth. Restricted flow channels are provided in the upper bushing to flow small quantities of glass into the production bushing. Means are provided to electrically isolate one bushing from the other, and means are provided to cool the flow channels from the upper bushing to the lower bushing.

7 Claims, 5 Drawing Figures

END VIEW

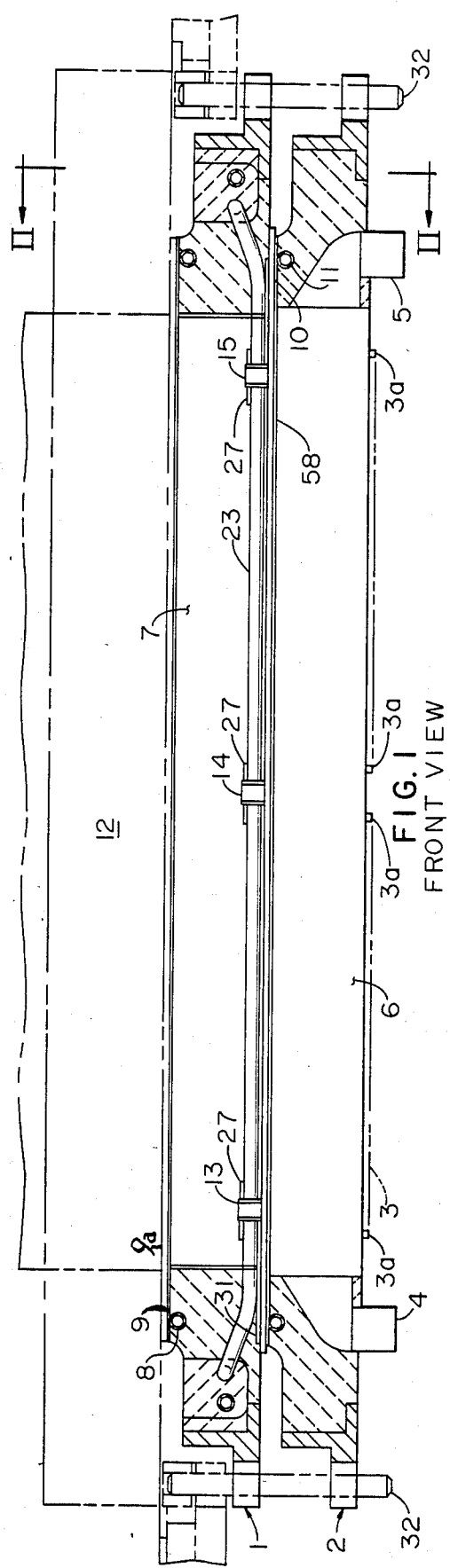
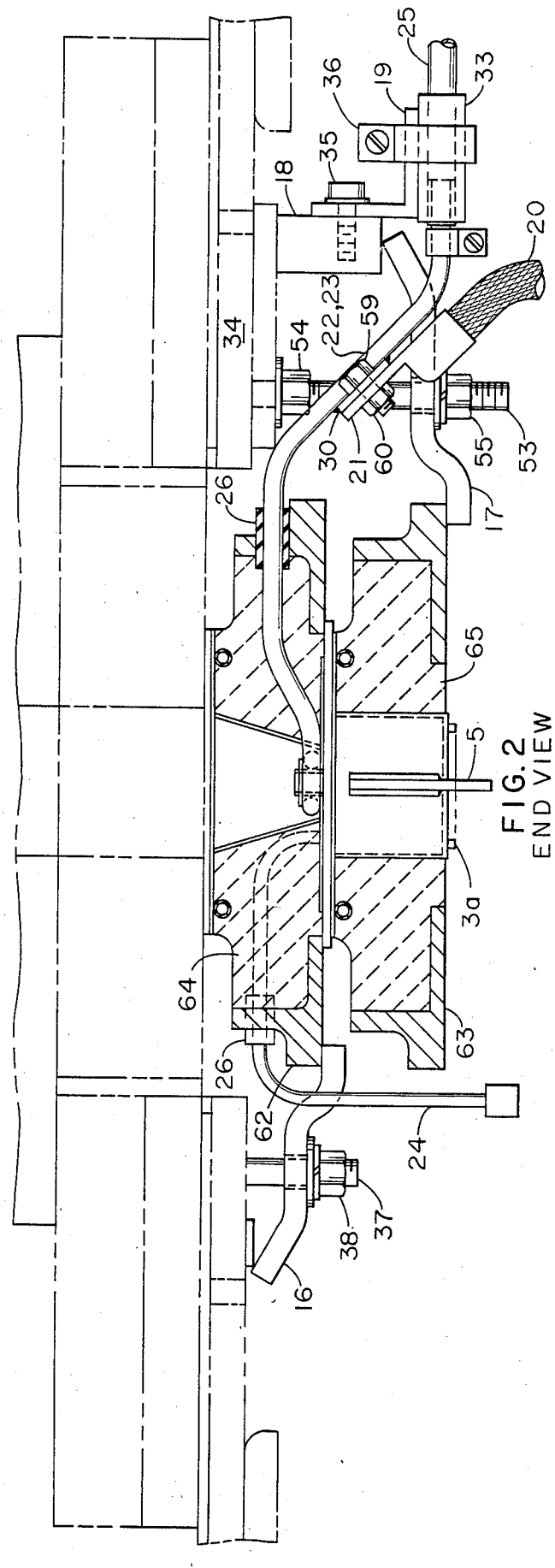
FIG. 1 FRONT VIEW
FIG. 2 END VIEW

TOP VIEW
UPPER BUSHING

FRONT VIEW
UPPER BUSHING

END VIEW
UPPER BUSHING

GLASS FIBER FORMING BUSHING ASSEMBLY

The present invention relates to fiber glass manufacturing. More particularly, the present invention relates to a novel fiber glass forming bushing assembly. Still more particularly, the present invention relates to a fiber glass forming bushing assembly which permits easy removal of a bushing for replacement or repair.

BACKGROUND OF THE INVENTION

In the manufacture of continuous glass fibers, glass batch ingredients are melted in furnaces. The molten glass resulting from the melting of the glass batch mixtures is then fed into elongated forehearths of various sizes and shapes. The molten glass flowing in the forehearths is removed at many locations positioned along the length of the forehearths from fiber glass forming bushings or spinnerettes. In a typical fiber glass manufacturing operation, a glass level of predetermined height is maintained in the forehearth being fed from the glass furnace. These forehearths are normally constructed of ceramic material resistant to molten glass attack and are frequently heated by combustion gases to maintain the molten glass during its passage through the forehearth at a given temperature. In some instances, electrodes can be used to supply electrical energy to the forehearth to maintain the glass at a desired temperature.

The bushings utilized to form the glass fibers are typically precious metal containers. These bushings are provided with a plurality of orifices usually on the bottom thereof through which molten glass housed in the container may pass freely to exit the bushing and form fibers. The orifices are arranged usually in rows and vary in diameter and number from bushing to bushing depending on the product strand being made from a given bushing. Bushings are typically mounted in cast iron frames and the frame has within its confines a castable ceramic surrounding the bushing metal to electrically isolate the bushing from the frame material. During operation the bushing is electrically heated to maintain a given uniform temperature therein. The bushing, through its frame, is bolted to a bushing block which is in fluid communication with a melting furnace forehearth. U.S. Pat. No. 3,837,823 gives a general description of the mounting of a bushing in a bushing frame and a bushing block. This patent also shows, in general, an arrangement of fiber glass furnace or melter and its associated forehearth and bushing positions.

It is common for a given furnace feeding a forehearth to have positioned in that forehearth as many as 40 to 100 bushings. These bushings are subject to frequent replacement due to change in demands for products being made in the market place as well as for repairs caused by mechanical failures such as leaks or cracks occurring in the bushings themselves. When a bushing must be changed to accommodate the changing requirements of the marketplace, for example, by replacing a bushing manufacturing one kind of strand with a bushing manufacturing another, or when a bushing must be replaced for repair caused by a leak or crack, present procedures require considerable time and effort.

In order to remove a bushing from its position on the forehearth, the bushing first has to have its electrical supply cut off. Once this is done, the glass contained in the bushing itself is allowed to cool until it solidifies. The bushing and the associated ceramic blocks located above it must also be chilled in order to insure that molten glass in the bushing block above the bushing per se has solidified prior to the removal of the bushing from its connection to the block. When glass in the block is solidified the bushing may then be chiseled away from the block. The chilling of the bushing block and the bushing is usually carried out by directing water onto the surfaces of the bushing for considerable periods of time. The chiseling of the bushing to separate it from its block and the chilling of the bushing and its associated bushing blocks introduce serious problems in the glass forming area.

First the chilling causes a thermal shock to glass flowing in the forehearth in the vicinity of the bushing position being removed. The chiseling of the glass, on the other hand, at the bushing block interface causes physical shock to the forehearth refractories in the vicinity of that position. These shocks cause thermal disturbances as well as contamination of the glass flowing in the forehearth which has upsetting effects on adjacent bushing positions within the forehearth. In addition, the shock cooling such large masses of glass and the subsequent mechanical operations which introduce physical as well as thermal shock to the forehearth are time consuming in addition to being deleterious. As will be apparent, they also reduce efficiency and the productivity of the entire forehearth area.

Thus, a need persists in the art to provide it with a rapid and easy method for the removal of bushings from forehearths with a minimum of disturbance of the thermal and physical environment surrounding the bushing being removed. The method also should be fast and efficient so that the loss of productivity during changeover of a bushing can be minimized.

One patent which has directed itself to this particular need is U.S. Pat. No. 4,525,188. In this patent, gas pressures are utilized to maintain glass flowing in a bushing below the level of the bushing flange while maintaining it above the level of the glass inlet to the bushing. Glass inlets are supplied which are of a small cross sectional area. This system provides a method of removing bushings which involves pumping gas into a bushing to push the glass contained within the bushing below the level of the gas inlets in the bushing while simultaneously disconnecting power to the bushing to thereby freeze off the reduced cross-sectional area inlets to solidify the glass therein and permit the bushing to be removed. While this process can be used efficaciously in providing for a rapid removal of a bushing, it does require careful control of glass levels within the bushing itself and delicate instrumentation to determine the glass level. It also requires the constant manipulation of gas pressures to maintain glass levels in bushings constant and to control glass levels when it is desired to remove the bushing.

SUMMARY OF THE INVENTION

In accordance with the instant invention, a novel bushing arrangement is provided which does not of necessity require the application of pressure thereto but does provide for a rapid disengagement of a bushing from a forehearth opening in an efficient manner with minimized thermal and mechanical shock to the bushing opening and to the bushings adjacent the bushing being removed.

In accordance with the instant invention, a permanent or anchor bushing is provided in a forehearth opening. The permanent bushing is provided with an upper and lower flange, end walls and a bottom. The bottom of the bushing is provided with at least one glass flow opening and preferably, a plurality of glass flow openings across its length. Each glass flow opening or port has a heat transfer member in contact with its surfaces. In the preferred embodiment, each port or opening has a heat transfer member in contact with its front and its back surfaces. Typically the heat transfer members are in the form of tubes. These front and back tubes carry heat transfer fluids therein and the intimate contact of the tube surfaces with the surfaces of the glass flow ports or port on both sides thereof provides an indirect heat exchange of these surfaces with the fluid flowing in the front and back fluid containing tubes.

Means are also provided to supply electric current to the heat transfer tubes so that they can be used to heat the ports or openings during bushing startup. A cooling loop contained in the castable ceramic surrounding the permanent bushing and positioned within the bushing frame is provided in the conventional manner. At one end of the upper bushing, a pressure control tube is provided which is typically connected to a suitable source of pressurized fluid. Means are provided to bolt the frame of the permanently affixed bushing to a second bushing adapted to have its bushing flange mate with the lower flange of the permanent bushing. Appropriate insulation means are positioned between the flanges of the two bushings to electrically isolate one bushing from the other. The second bushing is provided with the orifices in its bottom and is open at the top so that glass communication can occur through the glass supply ports of the upper bushing to the chamber formed by the sidewalls and bottom of the lower bushing. The bottom of the lower bushing, of course, is supplied with a plurality of glass fiber forming orifices arranged in rows and is also provided with means to connect it to a suitable power source so that current may be passed into the bushing to maintain the bushing at any given desired temperature. Further, insulating means are provided to electrically isolate the heat transfer tubes from the upper bushing frame to thereby avoid forming a direct current path from the heat transfer tubes to the forehearth frame.

An object of the invention is to provide a bushing which can be easily removed from a production operation and replaced by a second bushing of similar construction.

It is a further object of the invention to provide a fiber glass forming bushing which can be removed from a production operation with little or no thermal shock occurring to the forehearth opening in which the bushing is located.

It is still a further object of the present invention to provide a bushing which can be removed from a fiber glass production operation without requiring any severe mechanical or thermal shock to the forehearth opening in which it appears.

A still further object of the instant invention is to provide a bushing assembly permitting removal of a bushing with little more requirement than a cutting off of the electrical supply thereto.

These and other objects of the invention will become apparent from the ensuing description of the preferred embodiments of the instant invention.

BRIEF DESCRIPTION OF THE DRAWINGS

FIGS. 1-5 show the bushing from various views and detailed arrangements.

Figure 3:
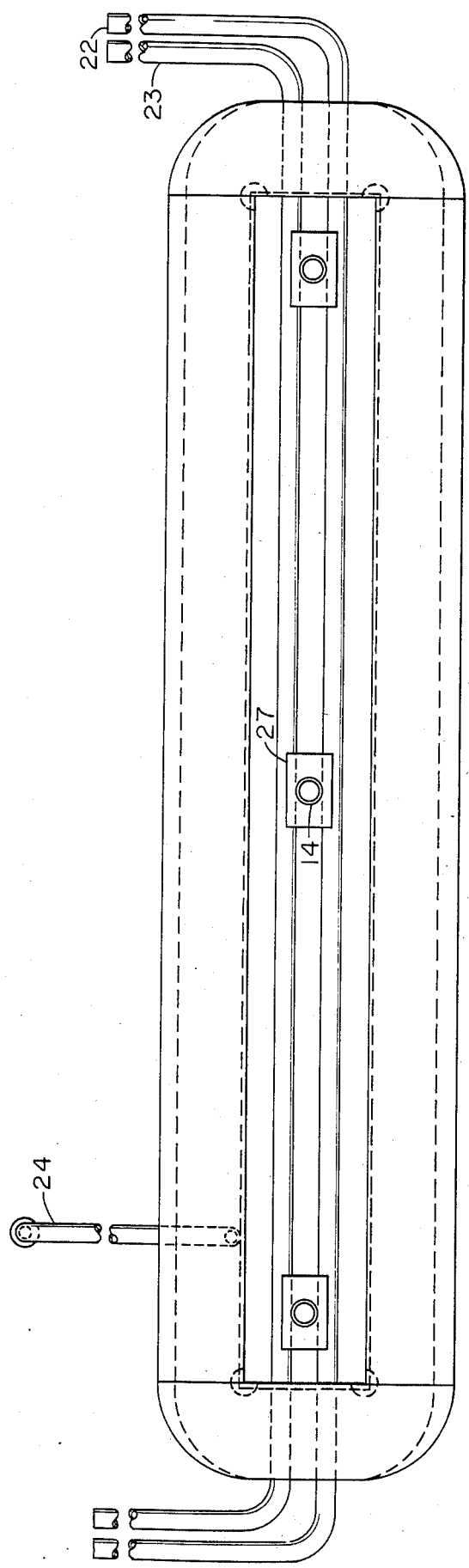

Turning to the figures W and FIGS. 1 and 2 in particular, there is shown therein an upper bushing generally indicated at 1 and a lower bushing generally indicated at 2. Bushing 2 is a production bushing equipped with a normal bushing tip plate 3 having a plurality of fiber forming tips 3a thereon, four being shown in the drawing of FIG. 1. It will be understood by the skilled artisan, however, that while only four tips 3a are shown in the drawing, the tip plate 3 contains many tips 3a which are typically arranged in multiple rows across the width of the bushing to thereby provide the requisite number of filaments for the strand being produced by the bushing.

The upper bushing 1 is provided with three glass supply ports 13, 14 and 15. The left supply port 13, right supply port 15 and the center supply port 14 are utilized to transmit glass from the upper chamber 7 of bushing 1 to the chamber 6 of bushing 2. A plate member 27 is placed around the upper end of the ports 13, 14 and 15 and is shown most clearly in FIG. 3. Bushing 1 is also provided with a tubular member 23 which transverses the bushing from end to end and is located at the rear of the supply ports 13, 14 and 15 and in contact therewith. A similar tube 22 is provided which traverses the bushing from end to end and is located in front of but in contact with the front surfaces of ports 13, 14 and 15 as shown in FIG. 3. A castable refractory 64 is inside of the upper bushing frame 62 and has a cooling ring or loop 8 embedded therein. In the lower bushing 2, a castable refractory member 65 located in lower bushing frame 63 carries a cooling loop 11 similar to that shown in bushing 1. This bushing, 2 which is a production bushing from which the glass fibers are formed as they exit the orifice tips 3a, is also provided with bushing ears 4 and 5 on either end thereof which are adapted to be connected to the secondary of a power transformer for the introduction of power to the bushing 2 to maintain temperatures therein constant.

The upper bushing 1 is also provided with a gasket 9a in contact with a flange 9 on its upper surface which extends outwardly from the sides and ends of the bushing as a flat plate surrounding the open top of bushing 2. A second flange 31 is provided on the bottom of bushing 2 and extends outwardly from the sides and end of the bushing as a flat plate surrounding the bushing bottom. The flange 31 is constructed and arranged to mate securely with insulating gasket 10. This results in the upper bushing being a double flange bushing. Lower bushing 2 has an upper flange 58 which is similar in size and shape to flange 31 and it mates with insulation gasket 10 also. Thus, as assembled and shown in FIGS. 1 and 2, the flange 58 of the production bushing 2 and the lower flange 31 of the upper bushing 1 mate with the insulation gasket 10 to form a glass and electric seal between the two bushings 1 and 2. The chamber 12 typically formed by ceramic walls can be the forehearth or a flow block constructed of ceramics which are substantially inert chemically to molten glass.

Figure 4:
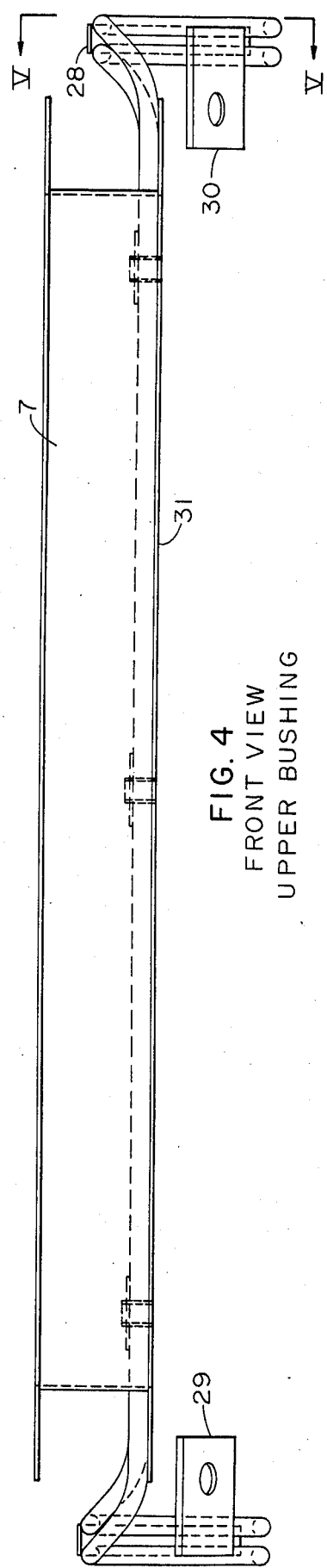
Figure 5:
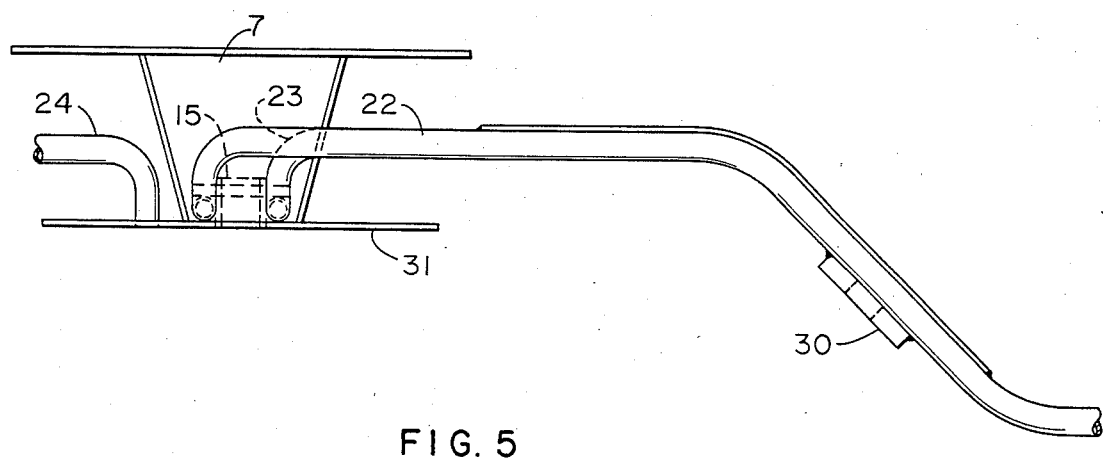

In FIG. 3, a more detailed arrangement of the tubes 22 and 23 is shown. These tubes traverse the length of the bushing 1 and as can be readily seen in the drawing, the tube 22 traverses the length of the bushing on one side of the supply ports 13, 14 and 15 and tube 23 passes on the other side of the same supply ports. As shown in FIG. 2, the tubes 22 and 23 terminate at the connecting member 33 to which is attached to a fluid supply source 25 such as an air supply. Supply source 25 delivers fluid through connector 33 to the tubes 22 and 23 for delivery to the upper bushing 1. Near the ends of tubes 22 and 23 is an electrical cable 20 and cable clamp 21 to which tubes 22 and 23 are firmly attached by welding them on their under surface to the surface of plates 30 (FIG. 4). Plate 30 is attached to clamp 21 through bolt (59) and nut 60 as shown in FIG. 2. It will be understood that a similar electrical connecting clamp and bolt (not shown) area located on the opposite side of the bushing and are used to attach plate 29 to its respective clamp (not shown). A pressure control device is shown in the form of a tube 24 which communicates with the chamber 6 of the lower bushing 2 and terminates at a point below the lower flange 31 of bushing 1. As can be seen from the end view, the lower bushing is wider than the upper one so that the termination of tube 24 on the undersurface of the flange 31 provides pressure communication between the glass head from the forehearth to the bottom bushing 2 up to the entrance to tube 24 (FIG. 5). The purpose of this tube 24 will be explained in more detail hereinafter.

Clamp 19 is anchored to the forehearth support 18 by bolt 35 at one end and on the other end is attached to the sleeve 33 using the strap 36. The lower bushing 2 is also supported by clamp 17 affixed to the bushing frame 63. Clamp 17 couples the lower bushing 2 to the upper bushing 1. Upper bushing 1, of course, is clamped to the bushing frame 62 by clamp 16, which is affixed to the forehearth by bolt 37 and nut 38. Clamp 17 similarly is affixed to the forehearth by bolt 53 and nuts 55 and 54.

In FIG. 3, which is a top view of the bushing 1, the tubes 22 and 23 are shown in more detail and the drawing also shows the configuration of the plate members 27 which are located on the front and back sides of the ports 13, 14 and 15. These plates 27 serve to contain the tubes in their proper location with respect to the ports and the bottom of the bushing and serve also as heat transfer surfaces for transmitting heat from the glass to the tubes and vice versa.

To operate the system of the instant invention, the upper bushing 1 is installed in the forehearth opening 12 and is bolted to the forehearth framing. This is done by fastening the bushing 1 to the forehearth iron 34 by bolts 37 and 53 and clamping the bushing frame 62 firmly to the forehearth using clamp 16. The lower bushing 2 with the desired fiber forming orifices 3a is installed next and is fastened to bushing 1 in the assembly system shown utilizing bolt 53 and its associated nuts 54 and 55 and the clamp 17 which holds the frame 63 of bushing 2 snugly so that the flange 58 of bushing 2 is seated firmly on gasket 10. Sufficient pressure is applied to ensure that gasket 10 also seats firmly against flange 31 of bushing 1. Once the bushings have been installed in their proper place, power is applied to both of them to permit glass to flow through both the upper and lower bushings. At the start up, bus bar 20 is connected to a power supply until glass flows. The lower bushing is energized from a power source and the connector 20 can then be disconnected once glass begins to flow from the lower bushing. The control tube 24 is pressurized to a pressure sufficient to match the glass pressure head applied to the bottom bushing, thereby preventing glass from flowing up through the control tube 24 and freezing it off.

The system will now function as a standard single bushing operation in that glass will flow from the forehearth opening 12 down through the supply ports 13, 14 and 15 and into the chamber 6 of the lower bushing 2 and through the orifice tips 3a thereof to form the necessary fibers. The plate members 27 of supply ports 13, 14 and 15 provide sufficient surface area around the ports to prevent any solid particles which may strike the bottom of the upper bushing 1 from rising up and entering through the ports. They also maintain a level of glass above the floor of the bushing a sufficient distance so that particulates of contaminating materials are maintained within the area below the plates 27 of those supply ports 13, 14 and 15. While the supply ports shown have been shown to be in three in number it is of course, possible to have more or less supply ports. It is preferred, however, that the supply ports be three in number and arranged with one in the center and one at each end so that the extremities and the center of the bushing are fed simultaneously with molten glass flowing from the forehearth through opening 12.

If a change occurs in bushing 2 for any reason, let us assume, for example, because a leak has occurred in the bushing 2, the following procedures are utilized. The first change necessary in order to remove the bushing involves cutting the power to the upper bushing 1. After power has been cut to the upper bushing 1, a cooling medium, preferably air, is connected to the left side of the back tube 23 and to the right side of the front tube 22. The cold air flowing through that tube which is in indirect heat exchange contact with the supply ports 13, 14 and 15 housing the glass contained in those tubes freezes off the glass in all those supply ports. While the air is flowing through the air tubes, the lower bushing is still being powered and glass is continuing to flow through the tip plate as long as there is glass remaining in the chamber 6 and as long as pressure is present in the control tube 24. Thus, when the glass is no longer flowing at the ports 13, 14 and 15, the control tube 24 can be increased in pressure to force the remaining glass in the lower bushing 2 through the orifices 3a to the atmosphere. Once the glass stops flowing through the orifices 3a, the lower bushing power is then turned off and the bushing is cooled and removed. A new bushing may now be installed to replace the lower bushing. As will be appreciated by the skilled artisan, the bushing change can be very quickly implemented without cooling the forehearth in the manner heretofore utilized in the prior art, thus minimizing the thermal shock to adjacent positions.

It is to be understood by those skilled in the art that many modifications may be made to the bushings of the instant invention without departing from the spirit and scope of the invention, but it is not intended that the instant invention be limited by any such modifications except insofar as appears in the accompanying claims.

I claim:

1. A fiber glass bushing assembly comprising a first bushing having sidewalls, an open top and a plurality of openings for the passage of molten glass on the bottom thereof, a second bushing having sidewalls an open top and bottom and positioned above said first bushing and affixed to an opening in a molten glass forehearth, molten glass passage ports in the bottom of said second bushing and in fluid communication with the said first bushing, means to electrically isolate said first and second bushing from each other, heat exchange means in contact with each of said passage ports to provide heat exchange with molten glass contained in said ports to heat or cool it, means to electrically heat said heat exchange means, and means to electrically heat the said first bushing to thereby control the glass temperature therein at a desired value.

2. The assembly of claim 1, wherein said heat exchange means comprises tubes in surface contact with said ports.

3. The assembly of claim 2 wherein means to connect said tubes to a heat exchange fluid is provided.

4. The assembly of claim 2 including means to electrically insulate said tubes from a bushing frame associated with said second bushing and from said first bushing.

5. The assembly of claim 3 including means to electrically insulate said tubes from a bushing from associated with said second bushing and from said first bushing.

6. A bushing assembly suitable for use in glass fiber forming comprising a first bushing having sidewalls, a bottom having a plurality of fiber forming orifices, and an open top, flange means around the top, a second bushing having an open top, sidewalls and a bottom provided with at least one restricted opening having an associated column open at the top thereof and affixed to the opening, lower and upper flange means around the bottom and the top of said second bushing respectively, an electrically insulating gasket between the flange of said first bushing and the upper flange of said second bushing, heat transfer means on at least two sides of said column, means to feed heat transfer fluid through said heat transfer means, means to pass current to said heat transfer means and means to supply current to the first and second bushing.

7. The bushing assembly of claim 6, wherein three restricted openings and three associated columns are provided and positioned to place on at opening and columns at each end of the bushing and one opening and column in the center.

* * * * *

UNITED STATES PATENT AND TRADEMARK OFFICE
CERTIFICATE OF CORRECTION

PATENT NO. : 4,704,150

DATED : November 3, 1987

INVENTOR(S) : Eugene D. McEathron

It is certified that error appears in the above-identified patent and that said Letters Patent is hereby corrected as shown below:

Title page:

Item [19] and [75]

The patentee's name is misspelled. The correct name is Eugene D. McEathron, not 'McEarthron'.

Signed and Sealed this

Ninth Day of August, 1988

Attest:

DONALD J. QUIGG

*Attesting Officer*  *Commissioner of Patents and Trademarks*